Feb. 2, 1943. H. E. EDGERTON Re. 22,260
SWITCHING SYSTEM FOR LIGHT-FLASH-PRODUCERS, SUCH AS STROBOSCOPES
Original Filed May 9, 1932
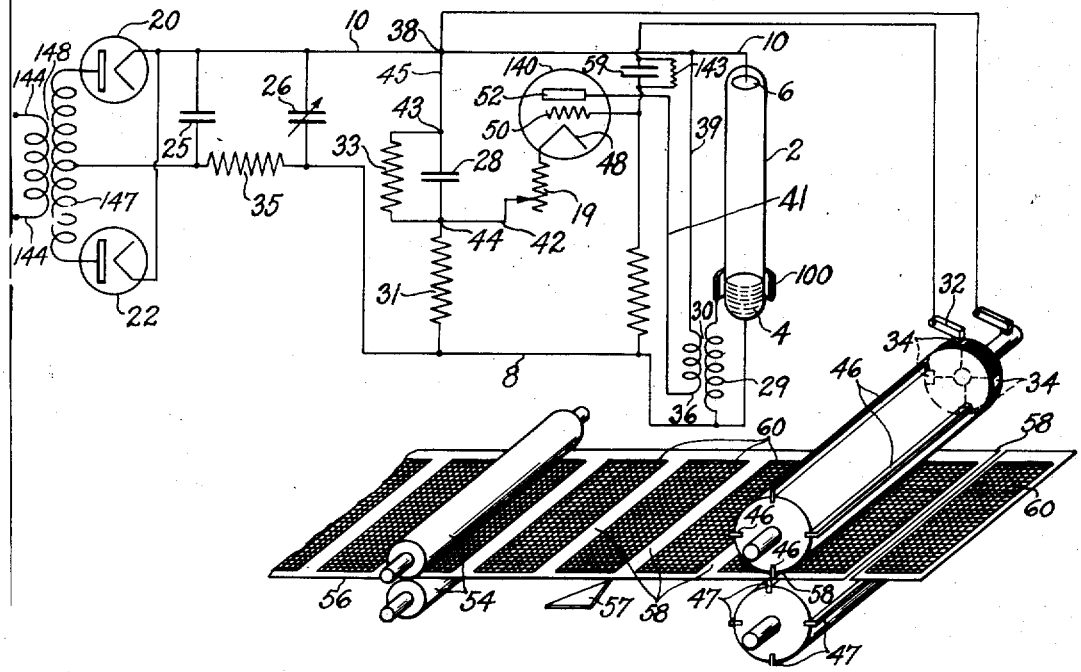
Inventor
Harold E. Edgerton
by David Rines
Attorney Reissued Feb. 2, 1943

Re. 22,260

UNITED STATES PATENT OFFICE 22,260

SWITCHING SYSTEM FOR LIGHT-FLASH PRODUCERS, SUCH AS STROBOSCOPES

Harold E. Edgerton, Belmont, Mass.

Original No. 2,181,879, dated December 5, 1939, Serial No. 610,045, May 9, 1932. Application for reissue March 11, 1941, Serial No. 382,832

2 Claims. (Cl. 176—124)

The present invention relates to switching systems for light-flash-producers, such as stroboscopes.

An object of the invention is to provide a new and improved switching system of the above-described character.

Other and further objects will be explained hereinafter and will be particularly pointed out in the appended claims.

The invention will now be described in connection with the accompanying drawing, the single figure of which is a diagrammatic view of circuits and apparatus illustrating the switching system of the present invention in its preferred form.

A mercury-arc gaseous-discharge lamp 2 is shown provided with a mercury-pool cathode 4 and an anode 6. The lamp 2 is normally non-conducting or ineffective, because the mercury gas therein is normally not ionized. The cathode 4 and the anode 6 are shown respectively connected by conductors 8 and 10 to a main discharge capacity or condenser 26. The main discharge condenser 26 is thus directly connected to the mercury-arc lamp 2, across the cathode 4 and the anode 6, through the conductors 8 and 10, with no limiting resistance or reactance except for that of the conductors 8 and 10.

The condenser 26 may be charged from a supply source of direct current, through a current-limiting series-connected impedance 35, which usually is a combination of resistance and inductance. The voltage supply for the condenser 26 may be a battery, a direct-current generator, or any other source of direct current. The switching system of the present invention may, however, be used also in connection with alternating-current sources (not shown). The illustrated voltage supply comprises a conventional, full-wave, rectifier circuit including thermionic or gaseous-discharge rectifiers 20, 22, connected with a source 144 of alternating current in any well known manner, as by means of the secondary winding 147 of a transformer 148. A capacitance 25 may be employed as part of this conventional source of direct current; its function is to maintain a supply of energy between the pulses of power transmitted through the rectifier units 20 and 22.

The conductor 10 terminates upon the anode 6, one terminal of the condenser 26, and one end of the direct-current supply for the condenser 26. The conductor 8 terminates upon the cathode 4, the other terminal of the condenser 26 and one end of the series impedance 35. The opposite end of the impedance 35 is shown connected directly to the other end of the direct-current supply for the condenser 26.

The current-supply circuit is thus shown extending from the voltage source 148, 20, 22, by way of the conductor 10, to the anode 6, where it is interrupted between the anode 6 and the cathode 4 by the mercury vapor in the tube 2; and thence, by way of the conductor 8 and the resistive-inductive impedance 35, back to the voltage source 148, 20, 22.

A small condenser 28 is connected across the cathode 4 and the anode 6 through the medium of oppositely disposed terminals 43 and 44. The condenser 28 is connected in series with an impedance 31, shown as a resistor, across any desired source of direct current, so as to be charged thereby. This source may be the same voltage source 148, 20, 22 as the direct-current supply for the condenser 26. A resistor 33, in parallel with the condenser 28, is sometimes necessary to prevent the self operation of the thyratron when the condenser 28 becomes fully charged.

A breaker electric system is provided for rendering the normally non-conducting lamp 2 conducting, thereby to permit the capacity 26 to discharge through the lamp 2, between the cathode 4 and the anode 6.

This breaker circuit, extending from the source of current 148, 20, 22, through a step-up transformer 30, to the cathode 4 and the grid 100, is shown as in two parts. In the first part, the source of current 148, 20, 22, or the condenser 28 charged thereby, a gas-filled, grid-controlled thermionic tube 140, such as a thyratron tube, and the low-impedance primary winding 36 of the transformer 30 are all connected together in series. The connections may be traced from the terminal 43 of the condenser 28, by way of a conductor 45, to a terminal point 38 of the conductor 10; thence, by way of a conductor 39, through primary winding 36 of the transformer 30 and, by way of a conductor 41, to the anode or plate 52 of the thyratron 140; then, through the mercury vapor of the thyratron 140, to its cathode 48; and through an impedance 19, shown as a resistor, and by way of a conductor 42, to the other terminal 44 of the condenser 28. The impedance 19 is adjusted until sufficient voltage is obtained to make the operation satisfactory. The transformer 30 and the impedance 19 may be connected in either the anode or the cathode circuit of the thyratron 140.

The second part of the breaker circuit comprises the secondary winding 29 of the transformer 30, connected on one side, by way of the conductor 8, to the cathode 4, and, on the other side, to an external condenser electrode or grid 100, shown disposed on the outside of the mercury-vapor lamp 2, around the mercury pool. It is possible to replace the external electrode 100 by an internal electrode (not shown), similarly excited from the secondary winding 29 of the transformer 30. This second part of the breaker circuit is interrupted by the grid 100 and the cathode 4.

The operation of the source of energy 148, 20, 22 upon the electrode 100 is controlled by tripping this breaker circuit, so as successively to open and close the same, in response to the opening and closing of a switch member or members 32, 34 included therein. The switch member or members 32 may be stationary, and the switch member or members 34 movable.

The switch connections may be traced from one side of the source 148, 20. 22 of current, by way of the conductor 10, to the terminal 38; then, to the switch members 32, 34; and thence to a small trip condenser 59, connected in parallel with a resistor 143, in the grid circuit of the thyratron 140. The circuit continues to the control-grid electrode 50 of the thyratron 140, and across the mercury-vapor space of the tube 140, to the cathode 48; then, through the resistor 19, and by way of the conductor 42, to the other side of the source of current 148, 20, 22.

Upon the closing of the switch members 32, 34 a surge of current is momentarily produced through the small trip condenser 59. This raises the potential of the grid 50 of the thyratron 140 to a high positive critical value with respect to the cathode 48.

The energy stored in the condenser 28 becomes thereupon violently discharged into the before-described first part of the breaker circuit, between the anode 52 and the cathode 48, through the thyratron 140, and through the low-impedance primary winding 36 of the step-up transformer 30. A relatively very high potential gradient becomes thereby magnetically induced very quickly and suddenly in the said second part of the breaker circuit, across the terminals of the secondary winding 29 of the step-up transformer 30, and consequently between the external condenser electrode 100 and the cathode 4. The effect of this quickly applied, high voltage is to provide a mercury-spot source of electrons upon the mercury-pool cathode 4, such that the normally non-ionized gas in the lamp 2 becomes ionized. Upon the lamp becoming thus conducting, the main discharge condenser 26 discharges its energy violently into the lamp 2, to produce an arc discharge between the cathode 4 and the anode 6 through the lamp 2, and part of the energy of this arc is transformed into a pulse of useful light. The flash of light is very intense and lasts about one-hundred-thousandth of a second. Sufficient quantity of light is obtainable in this manner to take a photograph in this very short time. The quantity of light is determined by the amount of energy in the condenser 26, the size of which may be increased until there is sufficient light for the frequency of flashing. Slow speeds need a larger capacity 26 than fast speeds. The operation of the thyratron 140, therefore, controls the flow of current in the breaker system, and the potential upon the grid 50 of the thyratron 140 controls the time of starting of the violent electrical transients that produce the light pulses.

After the production of the light pulse, the condenser 28 becomes again charged from the source of direct current 148, 20, 22. The charging current for the condenser 28 produces a voltage drop across the resistor 31, which is negative with respect to the cathode 48. This voltage drop is nearly equal to the voltage of the direct-current supply at the first instant, but becomes smaller as the condenser 28 begins to charge. The control grid 50 of the thyratron 140 is shown connected to the negative end of this resistor 31 through a resistor 142. Immediately after the condenser 28 discharges, therefore, the grid 50 is caused to be very negative with respect to the cathode 48. The thyratron 140 is therefore prevented from starting when the anode 52 becomes positive with respect to the cathode, as the condenser 28 builds up.

The resistor 143 has a resistance value such that the condenser 59 shall discharge when the switch members 32 and 34 are open, between flashes, in order to prepare for the next discharge surge. After the surge, the condenser 59 becomes re-charged, and the grid 50 again becomes negative with respect to the cathode 48.

The arc through the lamp 2 is not maintained, because of the action of the impedance 35, which limits the current flow to such an extent that the arc is extinguished. The condenser 26 is again charged before the next discharge. The inductance of the conductors 8 and 10 is useful in extinguishing the arc, as it tends to make the discharge current oscillatory. The instantaneous current through the mercury-arc light-pulse lamp is very great, about one thousand amperes.

Once the switch members 32 and 34 become closed, they may remain closed, without the thyratron 140 flashing on again, as the condensers 26 and 28 build up their voltages. The operation is independent of the length of time that the switches 32 and 34 remain closed, the complete function being performed at the moment when they first become closed.

The sudden, high voltage applied to the external electrode 100 for starting the lamp 2 may be applied in other ways than by the use of the step-up transformer 30. The surge in the grid circuit of the thyratron 140 may also be effected in other ways, as by the use of electrical transients in inductances or transformers, or by impulses from photoelectric cells, etc. The thyratron, moreover, may be omitted; a mechanical switch (not shown) may be used in its place. The use of the thyratron tube 140 makes it possible, however, to operate the circuit without any moving parts, except for the switch members 32 and 34 for causing the thyratron 140 to function electrically, as an inertialess switch. The current in the contact members 32 and 34, when the thyratron 140 is used, of course, is very much less than where a mechanical switch is used in place of the thyratron.

The flash-producer may be used as a stroboscope, either photographically or visually. A visual use of the stroboscope is illustrated in connection with the registering of the cutter of a paper-cutting machine, as claimed in Reissue Letters Patent 22,123, issued June 23, 1942. The cutter is shown constituted of a rotating knife or knives 46, which control also the operation of the movable switch member or members 34.

The knife or knives 46 are adapted to cut periodically a traveling paper web 56 along lines 58 between printed portions 60 as the paper is fed by feed rolls 54 from a printing machine (not shown) or a roll of web. The speed of the paper web 56 is manually controlled so that each knife 46, as it descends, shall always cooperate with a corresponding knife 47 so as to cut along the line 58. The knife or knives 46 are caused to energize the circuit of the mercury lamp 2 by means of the switch members 32 and 34. The paper will thus be stroboscopically illuminated by the lamp 2 in synchronism with the knife or knives 46 cutting the web 56. The paper appears stationary to the eye when it is illuminated by the stroboscopic light actuated from the knives, since the printing moves exactly one page for each knife. A stationary reference marker 57 is purposely placed so that it points to a distinguishing feature of the printing at the exact time of the flash from the lamp 2 so that the web shall be properly cut when it comes under the knife. It is therefore necessary merely to adjust the speed of the web 56 manually, so that it shall always appear to be in the correct position with regard to the pointer 57. The stroboscopic lamp 2 is arranged so that its light shall fall upon the printed web 60.

It will be understood that the switching system of the present invention is not limited to use with the type of lamp or circuit arrangement illustrated. Modifications will occur to persons skilled in the art, and all such are considered to fall within the spirit and scope of the invention as defined in the appended claims.

What is claimed is:

1. A switching system for a light-flash-producer comprising a lamp having an anode, a cathode and a grid, a current-supply circuit interrupted by the said cathode and anode, a capacity across the anode and cathode, and a breaker circuit interrupted by the grid and cathode and including a source of current.

2. A switching system for a light-flash-producer comprising a normally non-conducting gaseous-discharge lamp having an anode, a cathode and a grid and through which, when the lamp is conducting, a discharge may pass between the cathode and the anode, a current-supply circuit interrupted by the said cathode and anode, a capacity across the anode and cathode, a breaker circuit interrupted by the grid and cathode and including a source of current, and means operable in response to the operation of the breaker circuit for controlling the grid to render the lamp conducting, thereby to permit the capacity to discharge through the lamp between the cathode and the anode.

HAROLD E. EDGERTON.